United States Patent [19]
Bruce

[11] Patent Number: 5,781,587
[45] Date of Patent: Jul. 14, 1998

[54] CLOCK EXTRACTION CIRCUIT

[75] Inventor: Paul Bruce, Springfield, United Kingdom

[73] Assignee: Northern Telecom Limited, Montreal, Canada

[21] Appl. No.: 553,106

[22] Filed: Nov. 3, 1995

[30] Foreign Application Priority Data

Nov. 3, 1994 [GB] United Kingdom ............... 9422233

[51] Int. Cl.$^6$ ............................................. H04L 25/49
[52] U.S. Cl. .......................... 375/293; 375/360; 375/375; 327/141
[58] Field of Search .......................... 375/354, 355, 375/359, 360, 362, 371, 226, 324, 325, 326, 340, 375, 376, 293; 327/141, 144, 153, 161, 165, 166; 331/1 R, 18, 25

[56] References Cited

U.S. PATENT DOCUMENTS 4,456,890  6/1984  Carickhoff ..................... 375/376
5,056,118  10/1991  Sun ............................. 375/376
5,455,540  10/1995  Williams ....................... 375/376

FOREIGN PATENT DOCUMENTS 2 255 480  11/1992  United Kingdom.
2 259 632  3/1993  United Kingdom.
2 260 883  4/1993  United Kingdom.
2 263 609  7/1993  United Kingdom.
2 271 492  4/1994  United Kingdom.

*Primary Examiner*—Don N. Vo
*Attorney, Agent, or Firm*—Lee, Mann, Smith, McWilliams, Sweeney & Ohlson

[57] ABSTRACT

A clock extraction circuit for retiming a ternary data stream derives first and second binary streams corresponding respectively to the positive and negative going portions of the ternary data stream These binary streams are combined to provide a further binary stream which is retimed to a local clock whereby to generate a reference stream for retiming the first and second binary data streams to said reference stream. The retimed binary data streams are combined to generate a retimed ternary data stream.

6 Claims, 5 Drawing Sheets

CLOCK EXTRACTION CIRCUIT

This invention relates to digital transmission systems and in particular to clock extraction arrangements for such systems. The invention also relates to multiplexers/demultiplexers incorporating such clock extraction arrangements.

BACKGROUND OF THE INVENTION

A key feature of any digital transmission system in which a plurality of signals are multiplexed and demultiplexed is the provision of some means of synchronisation to ensure that the timing of transmission equipment such as a multiplexer/demultiplexer is matched to the signal timing. Conventionally this 'local' synchronisation is achieved by extracting timing or clock information from the digital signal itself.

As transmission bit rates are increased to provide a corresponding increase in system capacity, the accuracy of the extracted timing or clock information is becoming more and more crucial. A particular problem with conventional clock extraction techniques when sent at these higher bit rates is that of jitter in the extracted clock signal with consequent loss of precise timing. One approach to this problem has been the development of clock extraction limits in which a phase locked loop provides a substantially jitter-free 'flywheel' synchronisation with a received digital signal. A typical phase locked loop technique is described in specification GB-A-2,255,480. While this technique provides an effective solution, the circuitry required is complex and is thus relatively costly.

The object of the invention is to minimise or to overcome this disadvantage.

SUMMARY OF THE INVENTION

According to one aspect of the invention there is provided a clock extraction circuit for a digital transmission system and adapted to extract timing information from a ternary data pulse stream whereby to retime the ternary data stream, the circuit including means for deriving first and second binary signal streams corresponding respectively to the positive and negative going pulses of the ternary data stream, means for combining said first and second binary streams to provide a further binary stream, means including a local clock for generating from said further binary stream a reference signal stream, means for retiming said first and second binary data streams to said reference signal stream, and means for recombining said retimed binary data streams whereby to generate a retimed ternary data stream, characterised in that the reference signal stream is generated by retiming the further binary stream to the local clock, delaying the retimed further binary stream by one clock pulse, and combining the delayed binary stream with the further binary stream to provide a twice bit rate clock signal whose rising edges are aligned to the further binary stream and provide a timing reference for retiming said first and second binary signals.

According to another aspect of the invention there is provided a method of retiming a ternary data signal in a digital transmission system, the method including deriving first and second binary signal streams corresponding respectively to the positive and negative going pulses of the ternary data stream, combining said first and second binary streams to provide a further binary stream, generating from said further binary stream and from a local clock a reference signal stream, retiming said first and second binary data streams to said reference signal stream, and recombining said retimed binary data streams whereby to generate a retimed ternary data stream, characterised in that the reference signal stream is generated by retiming the further binary stream to the local clock, delaying the retimed further binary stream by one clock pulse, and combining the delayed binary stream with the further binary stream to provide a twice bit rate clock signal whose rising edges are aligned to the further binary stream and provide a timing reference for retiming said first and second binary signals.

The circuit may be employed for the retiming of ternary data in a digital repeater.

BRIEF DESCRIPTION OF THE DRAWINGS

An embodiment of the invention will now be described with reference to the accompanying drawings in which.

DESCRIPTION OF PREFERRED EMBODIMENT

Figure 1:
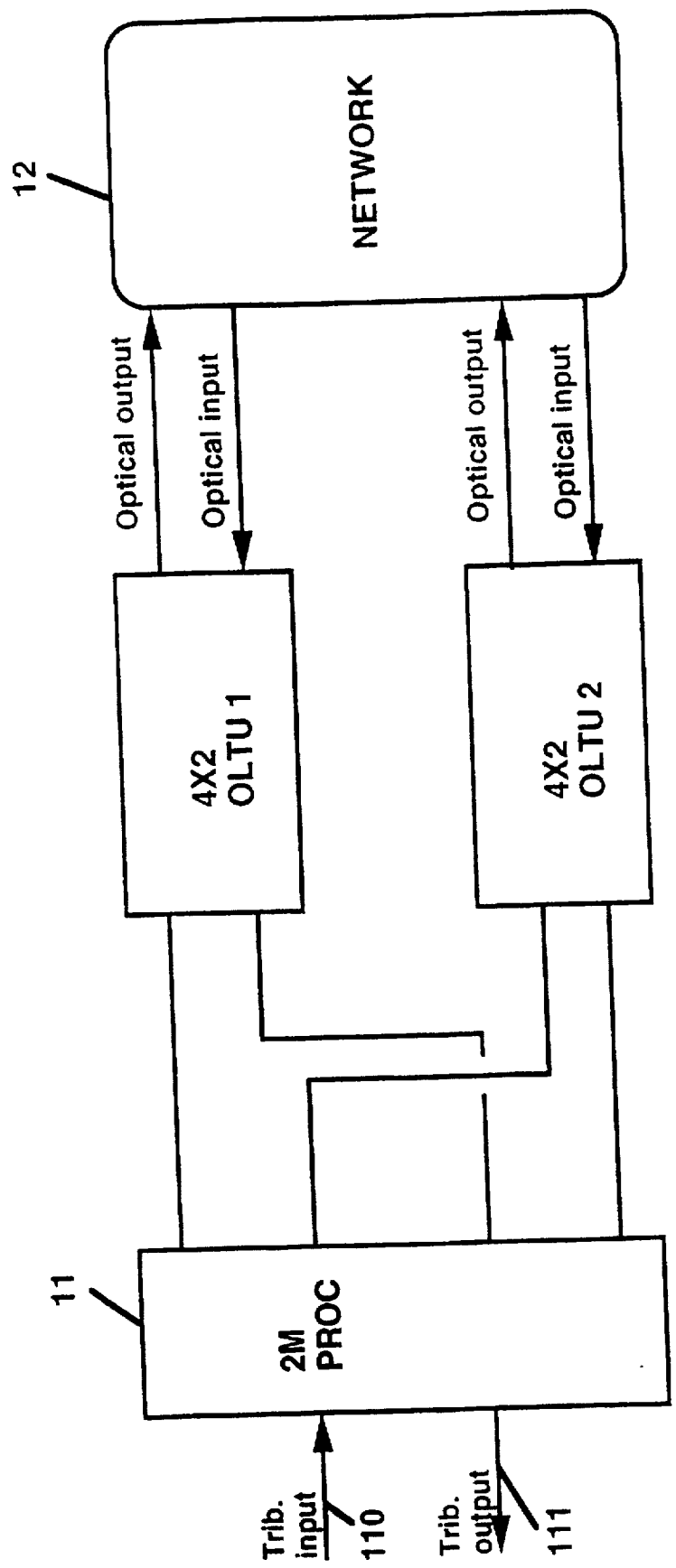
FIG. 1 is a schematic diagram of a digital multiplexer/demultiplexer arrangement.

Referring to FIG. 1, the multiplexer/demultiplexer arrangement includes a digital processor 11 coupled to a set of tributary inputs 110 and tributary outputs 111. Typically the tributaries comprise wired inputs and outputs and carry data at a rate of 2 Mb/s. The processor 11 is also coupled to a pair of optical line transmission units (OLTU 1 and OLTU 2) which provide an interface to an optical transmission network 12 comprising e.g. a passive optical network. In use, only one of the line transmission units is enabled at any one time, the other unit providing a back-up in case of a system failure.

Figure 2:
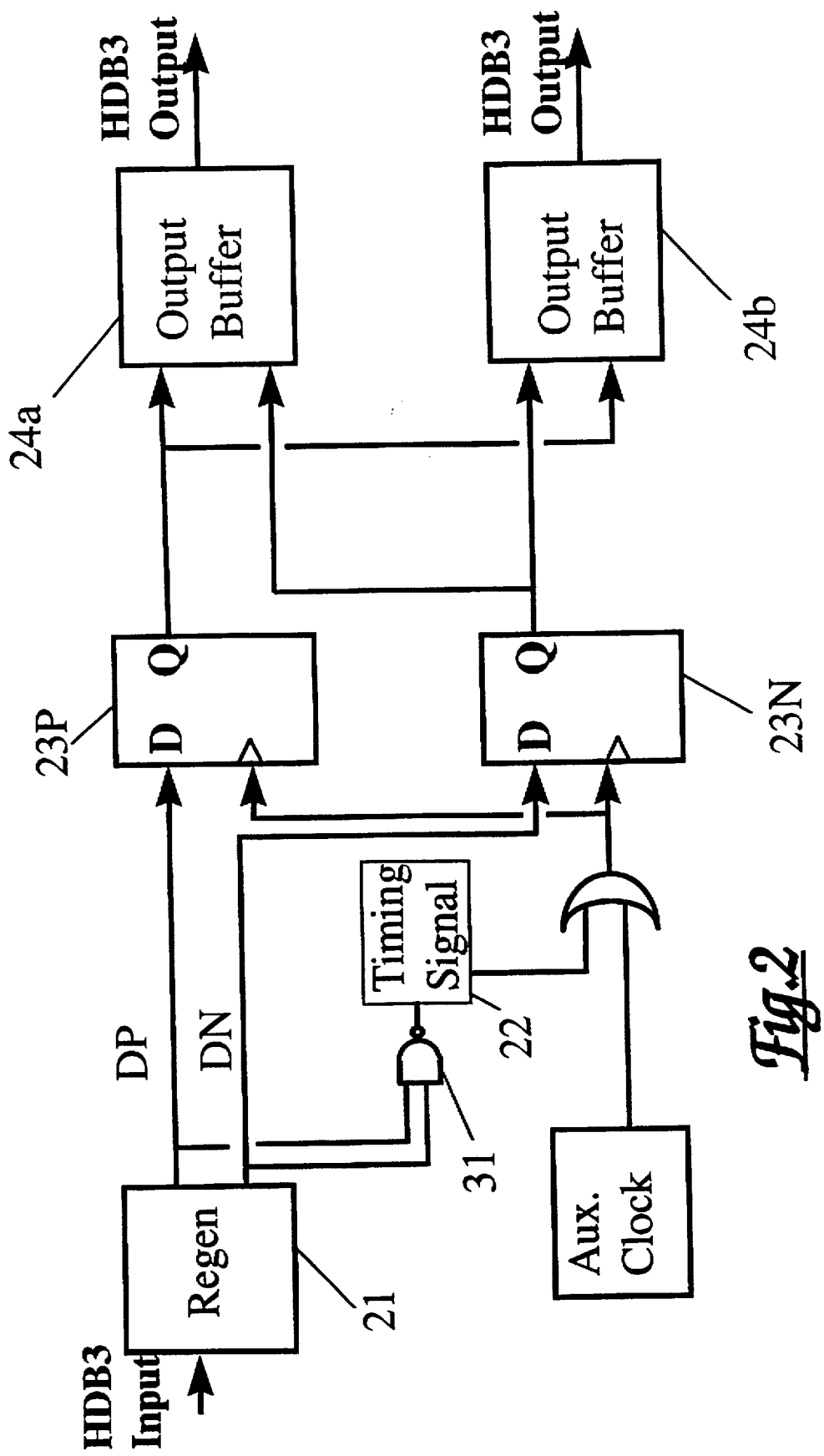
FIG. 2 shows in schematic form a digital processor for use in the multiplexer/demultiplexer arrangement of FIG. 1.

The processor is shown in further detail in FIG. 2 and includes means for regenerating (21) and retiming (22) ternary, e.g. HDB3 encoded data from the tributary input or from the line termination units. The regenerator 21 outputs two binary signal streams DP and DN corresponding respectively to the positive going and negative going pulses of the ternary data stream. These signals are fed to clock extraction circuit 22 via NAND gate 31 and to respective flip-flops 23P and 23N whose clock inputs receive timing information from the retiming means or clock extraction circuit 22. The retimed HDB3 signals are output in parallel to a pair of output buffers 24A and 24B. The processor accepts four tributary input signals from the served equipment and regenerates and retimes the data whereby to provide two identical copies of the input data stream for transmission to the network. Alarms such as loss of input signal, AIS present and HDB3 coding errors are extracted from the input data streams. In the reverse direction, the processor accepts eight inputs from the receive sides of the optical line termination units. The alarms are collected from these data streams and, optionally the processor may search for frame alignment and for framing errors. The tributary outputs are switched either individually or as a block of four.

Figure 3:
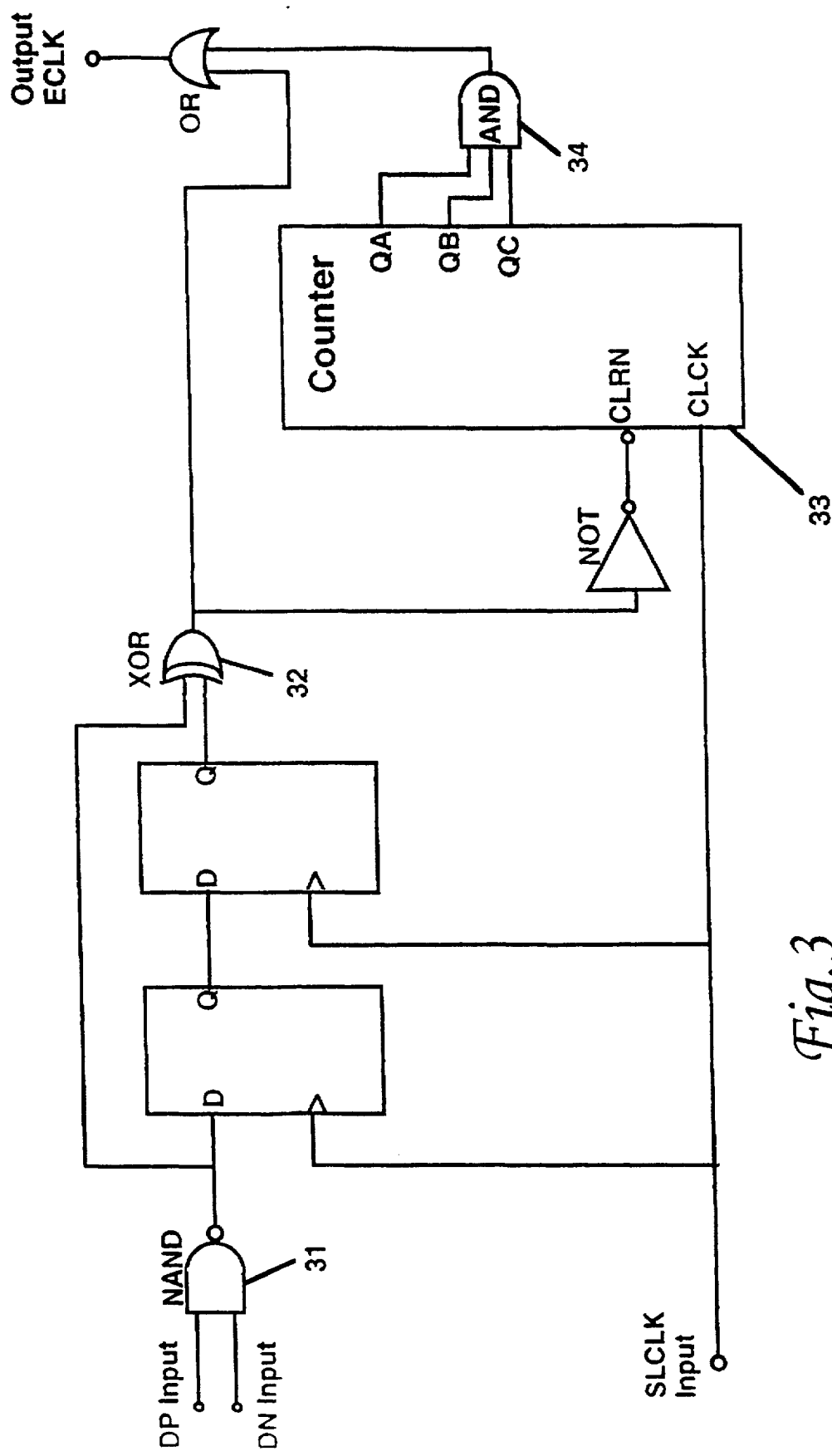
FIG. 3 shows a clock extraction circuit for use in the processor of FIG. 2.
Figure 4:
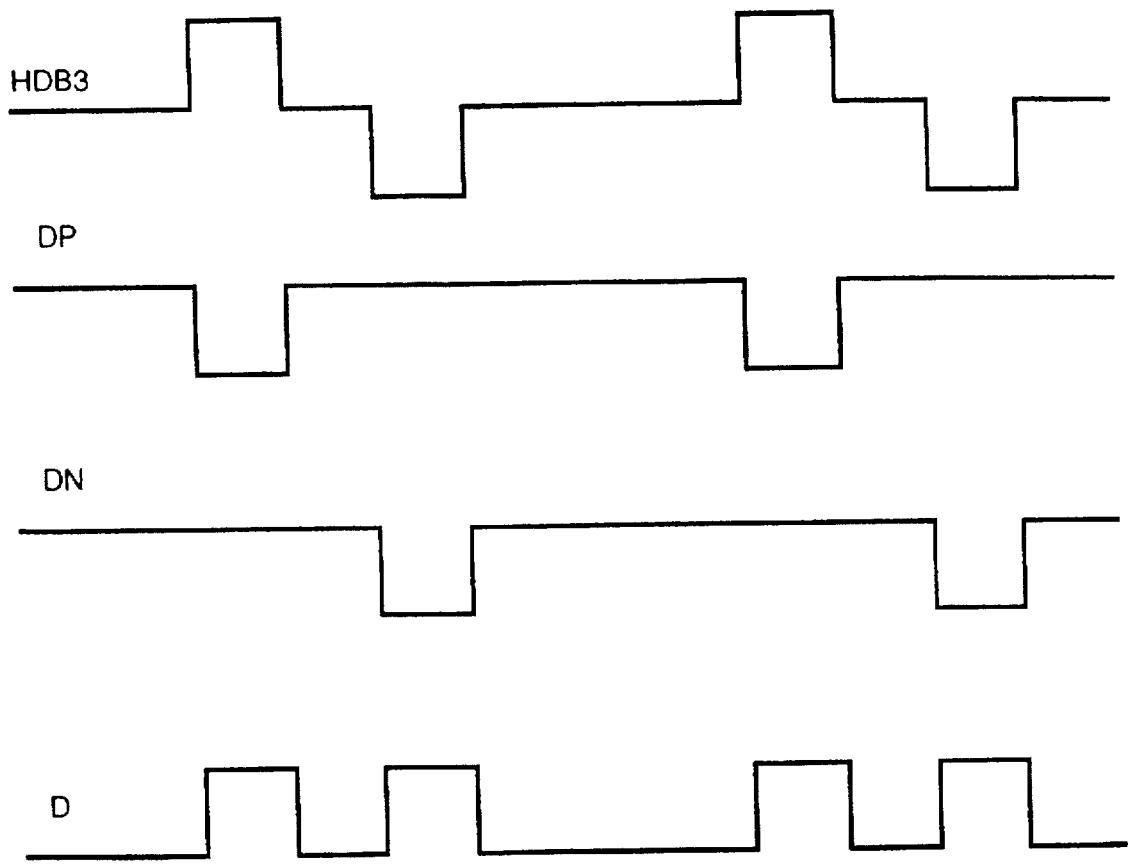
FIGS. 4 and 5 illustrate signal wave forms for the circuit of FIG. 3.
Figure 5:
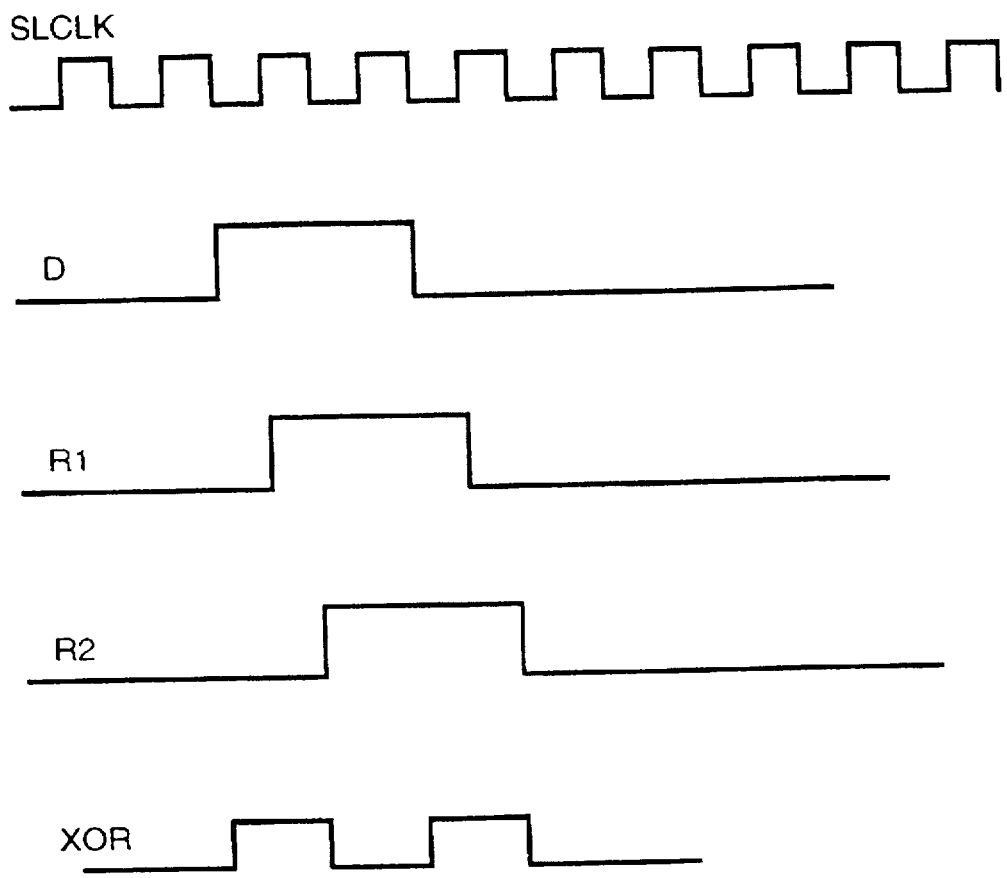

The clock extraction circuit 22 is shown in FIG. 3 and the associated signal waveforms in FIGS. 4 and 5. To facilitate the understanding of the technique, the time axis of FIG. 5 is compressed relative to that of FIG. 4. The positive going and negative going portions of the HDB3 data stream are used to generate respective data streams DP and DN. These data streams are combined by NAND gate 31 (FIG. 3) to provide a single data stream D (FIG. 4). This data stream D is then retimed (FIG. 5) using the external clock SLCLK to generate a waveforms R1 which is timed to the next positive going clock pulse and a second wave form R2 which is delayed by one clock pulse after R1. It will be understood that although the waveforms R2 can be generated directly, it is more convenient to generate this wave form indirectly from R1. The waveforms D and R2 are then combined in XOR gate 32 (FIG. 3) producing a twice bit rate clock (FIG. 5) whose rising edges are aligned to the data stream and which can be used to retime the input data stream. The falling edges of the XOR output are aligned to the standby clock so that the clock pulse will have a mark/space ratio within set limits. The falling edges will be subject to jitter as they are not related to the data frequency, but this is no disadvantage as the falling edges are not used in the retiming process.

The gapped clock produced at the XOR gate output is used to continually reset the counter 33 (FIG. 3). When a zero or space is encountered in the output signal, the counter is allowed to run until it reaches its termination value where QA=QB=QC=1 under which condition a single clock pulse is generated at the output of the AND gate 34. This clock pulse is used to retime the zero. Although this clock is not related to the data stream, no jitter is added as the zeros or spaces do not contain any timing information. There is no necessary to decode the retimed data before it is applied to the output buffers 24A and 24B (FIG. 2) to provide a broadcast transmit facility.

I claim:

1. A clock extraction circuit for a digital transmission system and adapted to extract timing information from a ternary data pulse stream whereby to retime the ternary data pulse stream, the circuit including means for combining first and second binary signal streams derived from the positive and negative going pulses of the ternary pulse stream to provide a further binary stream, means including a local clock for generating from said further binary stream a reference signal stream, means for retiming said first and second binary signal streams to said reference signal stream, and means for recombining said retimed binary signal streams whereby to generate a retimed ternary data stream, wherein the reference signal stream is generated by retiming the further binary stream to the local clock, delaying the retimed further binary stream by one clock pulse, and combining the delayed binary stream with the further binary stream to provide a twice bit rate clock signal whose rising edges are aligned to the further binary stream and provide a timing reference for retiming said first and second binary signal streams.

2. A clock extraction circuit as claimed in claim 1, wherein said retimed ternary data pulse stream is generated as two identical signals in parallel.

3. A clock extraction circuit as claimed in claim 2, wherein said ternary signals are HDB3 signals.

4. A method of retiming a ternary data pulse stream in a digital transmission system, the method including deriving first and second binary signal streams corresponding respectively to the positive and negative going pulses of the ternary data pulse stream, combining said first and second binary signal streams to provide a further binary stream, generating from said further binary stream and from a local clock a reference signal stream, retiming said first and second binary signal streams to said reference signal stream, and recombining said retimed binary data streams whereby to generate a retimed ternary data pulse stream, wherein the reference signal stream is generated by retiming the further binary stream to the local clock, delaying the retimed further binary stream by one clock pulse, and combining the delayed binary stream with the further binary stream to provide a twice bit rate clock signal whose rising edges are aligned to the further binary stream and provide a timing reference for retiming said first and second binary signal streams.

5. A method as claimed in claim 4, wherein said retimed ternary data pulse stream is generated as two identical signals in parallel.

6. A method as claimed in claim 5, wherein said ternary signals are HDB3 signals.

* * * * *